United States Patent [19]

Boothroyd et al.

[11] Patent Number: 4,583,199

[45] Date of Patent: Apr. 15, 1986

[54] APPARATUS FOR ALIGNING AND PACKING A FIRST OPERAND INTO A SECOND OPERAND OF A DIFFERENT CHARACTER SIZE

[75] Inventors: Donald C. Boothroyd, Phoenix; Robert W. Norman, Jr., Glendale, both of Ariz.

[73] Assignee: Honeywell Information Systems Inc., Phoenix, Ariz.

[21] Appl. No.: 394,952

[22] Filed: Jul. 2, 1982

[51] Int. Cl.[4] .............................................. G06F 7/00
[52] U.S. Cl. .................................................... 364/900
[58] Field of Search ... 364/200 MS File, 900 MS File; 377/54, 64, 81

[56] References Cited

U.S. PATENT DOCUMENTS

| | | | |
|---|---|---|---|
| 3,436,737 | 4/1969 | Iverson et al. | 364/900 |
| 3,916,388 | 10/1975 | Shimp et al. | 364/200 |
| 3,969,704 | 7/1976 | Liebel, Jr. | 364/900 |
| 4,219,874 | 8/1980 | Gusev et al. | 364/200 |
| 4,321,665 | 3/1982 | Shen et al. | 364/200 |
| 4,408,272 | 10/1983 | Walters | 364/200 |

*Primary Examiner*—Thomas M. Heckler
*Attorney, Agent, or Firm*—A. A. Sapelli; J. S. Solakian; A. Medved

[57] ABSTRACT

The present invention relates to an alignment network for aligning data words having a plurality of data word formats. A plurality of shifters are utilized, each shifter utilized to shift the corresponding bit of each character. When the output data word format is different from the input data word format, selected characters in response to a predetermined control signal are temporarily stored so that they may be inputted to the shifters on the next shift cycle in order to achieve the desired shifted character order. An alignment switch then aligns or packs the shifted data from the output of the shifters to the predetermined data format in response to a select control signal.

4 Claims, 14 Drawing Figures

APPARATUS FOR ALIGNING AND PACKING A FIRST OPERAND INTO A SECOND OPERAND OF A DIFFERENT CHARACTER SIZE

RELATED PATENT APPLICATIONS

The present patent application is related to U.S. patent application, Ser. No. 394,951, now U.S. Pat. No. 4,506,345, entitled "A Data Alignment Circuit" by Donald C. Boothroyd, et al., filed on even date herewith, and assigned to Honeywell Information Systems Inc., the assignee of the present application.

BACKGROUND OF THE INVENTION

This invention relates to an execution unit of a central processing unit within a data processing or computer system, and more particularly, to a circuit utilized for the execution of data manipulation type instructions including shift, move and rotate instructions.

In computer systems, various type computer words are defined having specific formats, including instruction words having a specified instruction format and data words having a plurality of predetermined data formats. In order to maximize the efficiency of the overall computer system, the data words can take on a variety of formats. The formats are defined to maximize memory storage efficiency, to minimize the time required for the conversion to an output device format, to maintain the data in a format readily available to the execution units, etc, the data selection being made by the designer to achieve one or more of the aforementioned objectives as they relate to the computer word size.

The various alpha, numeric, and special characters can be defined in a computer in a variety of ways. In many present, existing systems the characters are defined utilizing a grouping of eight bits in a coded format, commonly known as an 8-bit binary coded decimal (BCD) format. This grouping of eight bits allows sufficient capacity to define all the alpha characters, both upper and lower case, the numeric characters, and a variety of special characters, the 8-bit BCD format having achieved a high degree of standardization within the computer industry. In addition, the eight bits are divisible into the standard computer word sizes of many computer systems, these computer systems utilizing 8-bit bytes, or words of 16, 24, or 32 bits. These computer word sizes being divisible by 8 allow for a high degree of symmetry which is highly desirable in data manipulation. However, in some large data systems, a computer word size of 36 bits is sometimes defined.

In addition, to utilizing the aforementioned 8-bit format, data word formats can be defined utilizing a grouping of 4 bits or 6 bits for defining numeric characters. By defining multiple data formats for numeric characters, the programmer is given the flexibility to realize the aforementioned objectives.

Before any arithmetic operations can be performed, the data formats must be uniform. Hence, an operand having one type of data format must be converted to the data format of a second operand, i.e., the data formats of the two operands must be the same. Also, the numeric operands must be aligned, e.g., right justified or compensated for scale factor difference.

In previous systems, alignment of many data formats was performed a character at a time. The present system provides for aligning data a word at a time, achieving a significant speed increase in processing, i.e., aligning, the data.

SUMMARY OF THE INVENTION

Therefore, there is supplied, in a computer system, having a plurality of predefined computer words, including data words having a plurality of data formats, each data format having a predetermined number of characters within the data word, an alignment network for aligning the data words. The alignment network is comprised of a shift network, having a first set of input terminals, a second set of input terminals, and a set of output terminals, to couple selected ones of the first and second set of input terminals to the output terminals in response to a shift count control signal. The alignment network also includes a register element for temporarily storing at least two contiguous data words of a data block. The register element applies a first data word of two contiguous data words to selected ones of the second set of input terminals and a second data word of two contiguous data words to selected ones of the first set of input terminals, thereby affecting a shift of the data words. A holding register element temporarily stores data of selected ones of the output terminals in response to an enable control signal. The temporarily stored data is coupled to selected ones of the first and second set of input terminals on a next shift cycle.

An alignment element aligns (or packs) the shifted data of the output terminals to one of the plurality of data formats in response to a select control signal.

Accordingly, it is an object of the present invention to provide a device for aligning data words having a plurality of formats.

It is another object of the present invention to provide a device for aligning a data word having a first data word format.

It is still another object of the present invention to provide a device for aligning a data word having a first data format to a data word having a second data word format wherein the first and second data word formats utilize different number of bits to define a character.

These and other objects of the present invention will become more apparent when taken in conjunction with the following description and attached drawings, wherein like characters indicate like parts, and which drawings form a part of the present application.

DETAILED DESCRIPTION

Figure 1:
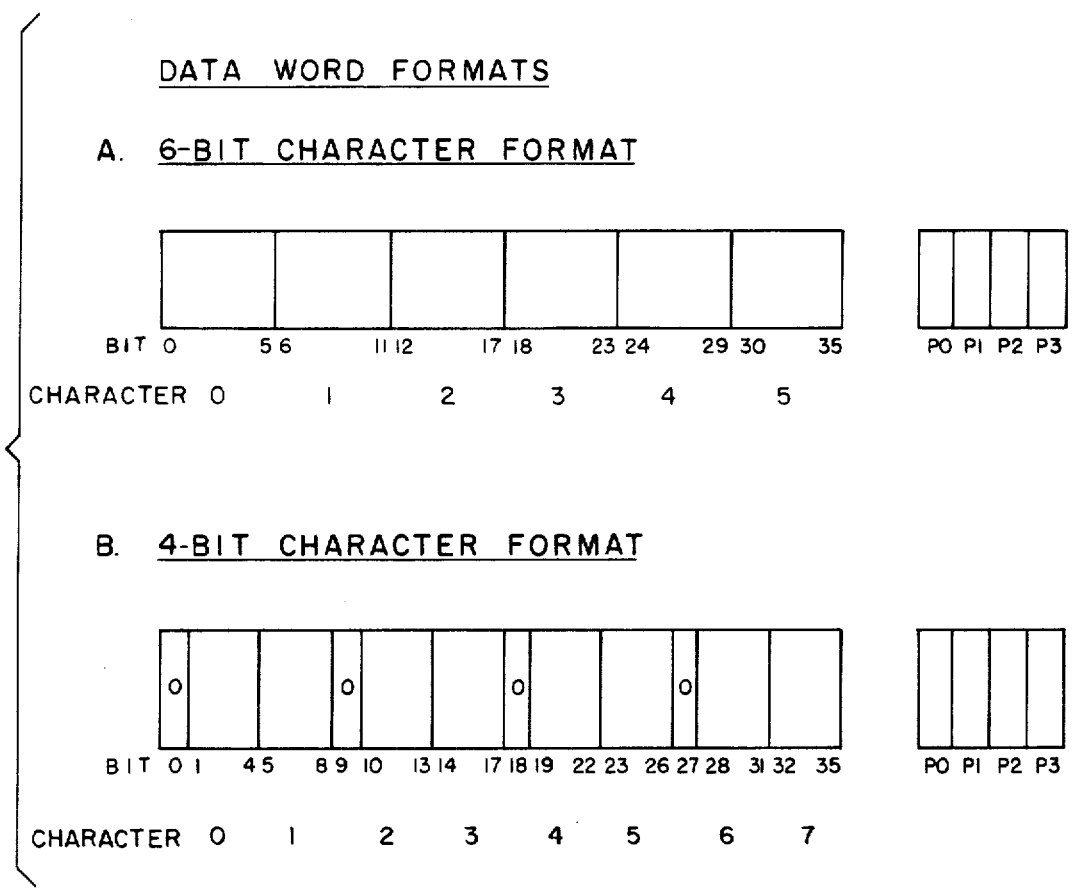
FIG. 1 shows data word formats of the preferred embodiment.

Referring to FIG. 1, there is shown a 36-bit computer word having a six-bit character format and a four-bit character format. The six-bit character format (FIG. 1A) utilizes 6 bits to define a character, bits 0–5, 6–11, 12–17, 18–23, 24–29, and 30–35 defining characters 0, 1, 2, 3, 4, and 5, respectively. The four-bit character format (FIG. 1B) utilizes four bits to define a character, bits 1–4, 5–8, 10–13, 14–17, 19–22, 23–26, 28–31, and 32–35, defining characters 0, 1, 2, 3, 4, 5, 6 and 7, respectively. Characters 0 and 1 of the four-bit character format are defined by utilizing the first nine bits of the 36-bit computer word and dividing the nine-bits as shown in the figure, yielding two characters. This configuration yields the high degree of symmetry mentioned above, and is explained in further detail in the related application referenced above. No further discussion relating to symmetry will be provided herein since it is not necessary for understanding the present invention. The remaining bit assigned to the high order bit (i.e., the left most bit as shown in the figure), bit 0, is essentially a "don't care" or "irregular" bit. Likewise, characters 2, 3, 4, 5, 6 and 7, of the four-bit character format is defined in accordance with the drawing of FIG. 1B. The high order bit, or don't care bit, of the four-bit character format word, bits 0, 9, 18 and 27 can always be set to zero. Four additional bits in the 4 bit character format (and utilized for a 9-bit character format) $P_0$, $P_1$, $P_2$, and $P_3$, can be carried along as the parity bits of respective characters. The "don't care" bit is utilized, in the preferred embodiment, as a parity bit, and is described in detail in the related application referenced above and will not be described further hereinunder since it is unnecessary for an understanding of the present invention.

Figure 2:
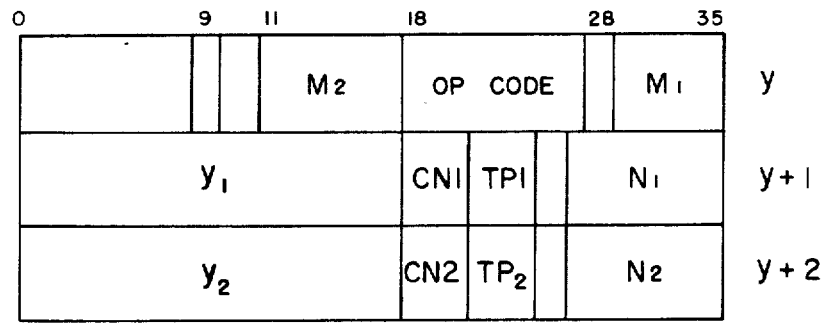
FIG. 2 shows an instruction format computer word of the preferred embodiment.

FIG. 2 shows an instruction format computer word of the preferred embodiment. The instruction word is the first word of the grouping and resides in a main memory (not shown) of a computer system at a location y. Two operand descriptor words reside in contiguous locations y+1, and y+2. The instruction word contains the operation code, OP CODE, and two address modifier fields, M1 and M2, for the operand descriptor words. The operand descriptor words contain a field which defines the address of the operand y1, y2, a field which specifies the character number, CN1, CN2, within the data word referenced by the operand address, a field which indicates the number of characters N1, N2, to be operated upon, and the field indicating the type (i.e., the character format) TP1, TP2 of the data word referenced.

The invention of the present application utilizes a single device to shift data words of the six-bit character format to a data word also having a six-bit character format, or to shift data words of the six-bit character format to a data word having a 4-bit character format. This shifting operation is achieved by utilizing a shifter network 205 comprising six (6) shifter integrated circuit chips generally shown in FIG. 3.

Figure 3:
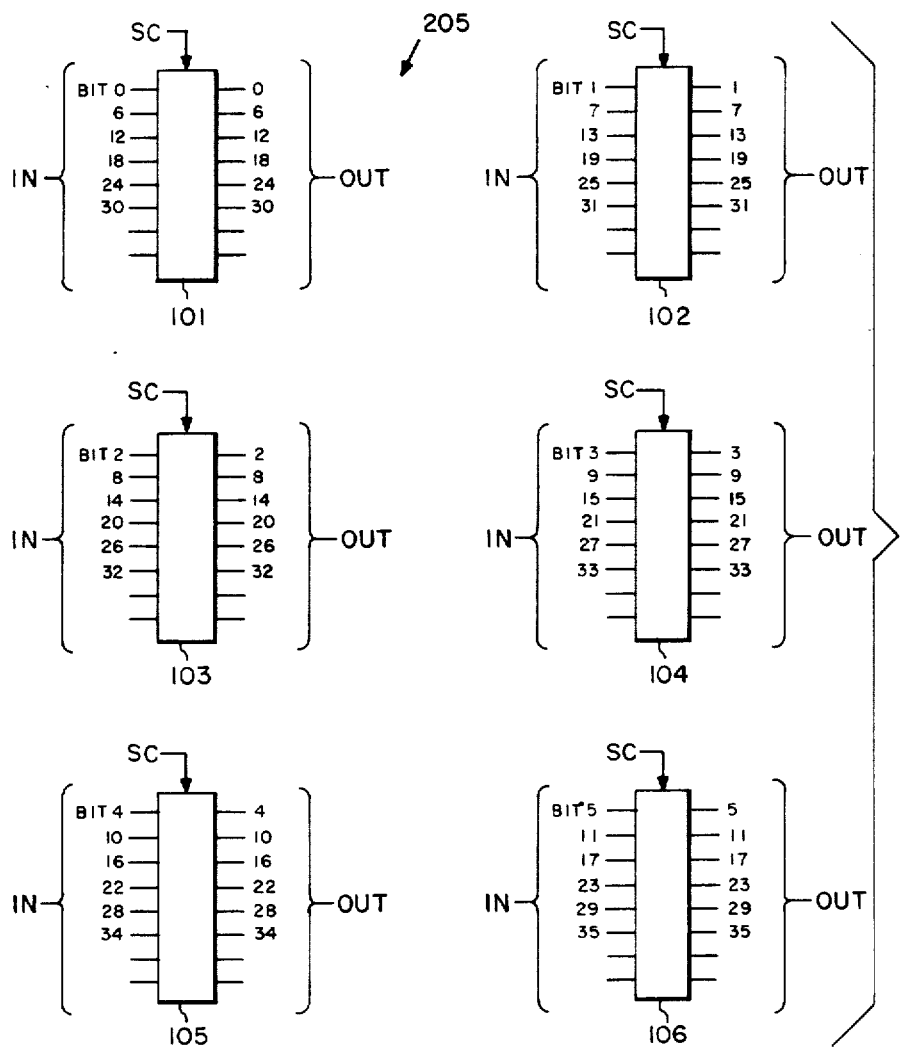
FIG. 3 shows a general shifter network of the present invention.
Figure 4:
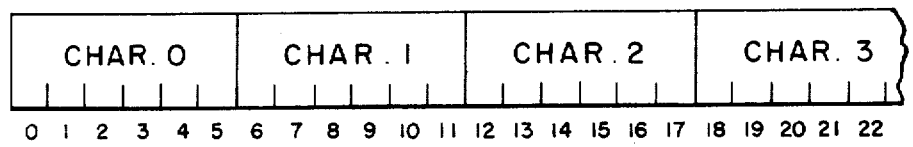
FIG. 4 shows an expansion of the partial data word of FIG. 1.

FIG. 4, is an expansion of the partial data words of the preferred embodiment of the six-bit character format (FIG. 4), including the bit allocations. Referring to FIGS. 3 and 4, the general operation of the shifter network 205 of the preferred embodiment will be described. If character 0 of the six-bit character format were to be shifted one character, bit 0 would be shifted into the bit 6 position. Similarly for a shift of 2, 3, 4 . . . character positions, the bit 0 of character 0 would be shifted to bits 12, 18, 24 . . . respectively. To implement this shift, the first bit (or high order bit position) of all six characters of the six character format word is input to a first shifter 101 in character order. Hence, bit 0, bit 6, bit 12, . . . , the first bit of characters 0, 1, 2, . . . is coupled to the respective terminals of first shifter 101. Namely, bit 0 is coupled to a first input terminal, bit 6 is coupled to a second terminal, . . . , the first input terminal, second input terminal, . . . being sequential or consecutive input terminal positions of the shifter. Likewise, the second bit of each character of the six-bit character format, bits 1, 7, 13, . . . is input to a second shifter 102 in consecutive order. The third bit position of each character, bits 1, 8, 14 . . . , the fourth bit position, bit 3, 9, 15, . . . , the fifth bit position, bit 4, 10, 16 . . . and the sixth bit position, bit 5, 11, 17 . . . , is input to the respective third shifter 103, fourth shifter 104, fifth shifter 105, and sixth shifter 106, in consecutive order. Each shifter has a shift count input which causes a bit at an input terminal to shift to an output bit position equal to the number specified by the shift count. The shift count corresponds to the character shift being performed for the six-bit character format. Hence, for a shift of 1 character position, the shift count has a value corresponding to one.

Figure 5:
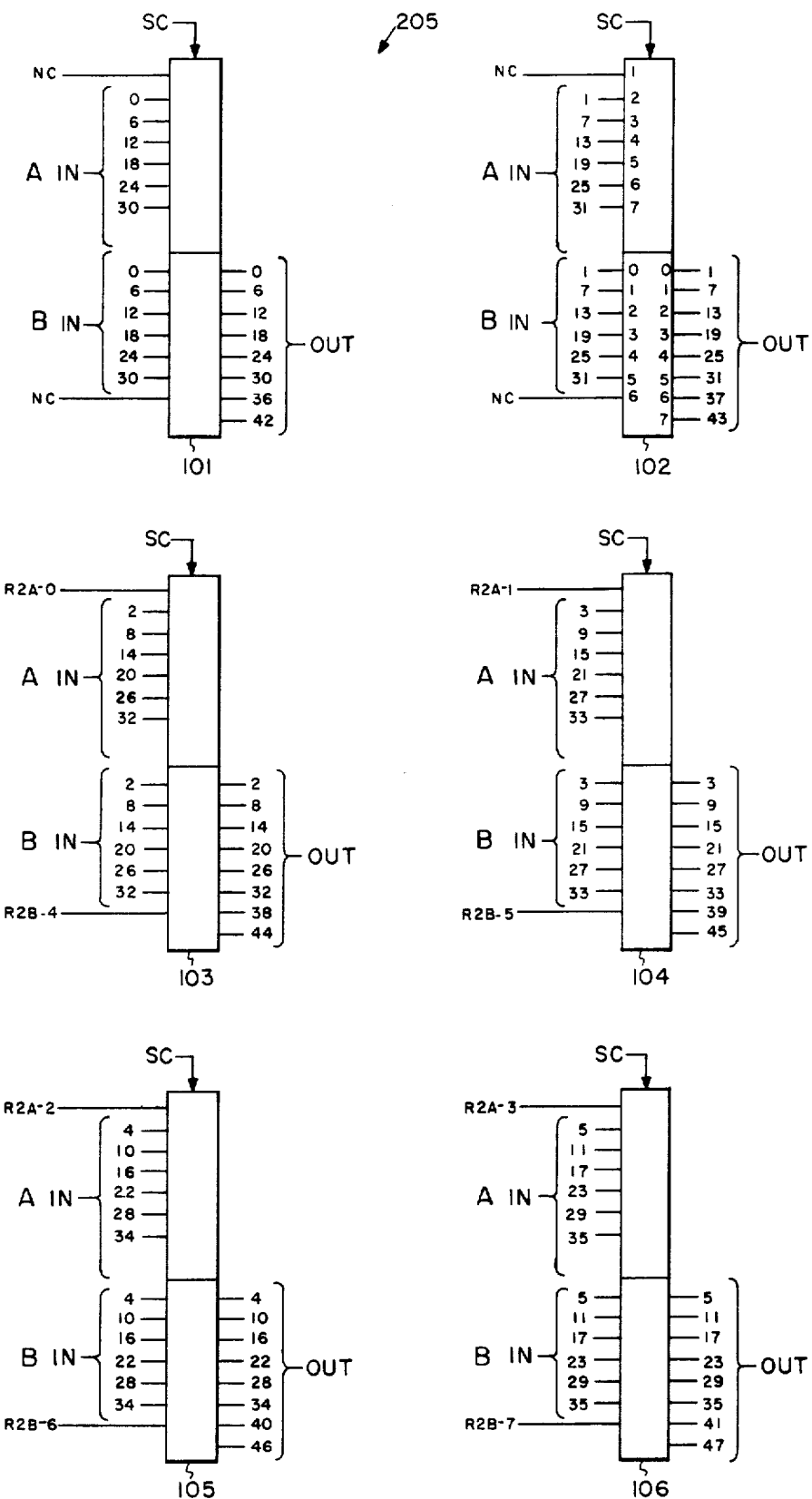
FIG. 5 shows the shifter network of the preferred embodiment.

FIG. 5 shows the shifter network 205 of the preferred embodiment. Each of the six shifters contain both a B input and an A input. Six corresponding bits are coupled to the A and B inputs; since the maximum shift count is five. Each word to be shifted is applied to the shifter inputs twice, once to the A input and once to the B input. The shifters 103–106 utilize two additional inputs and the output of all the shifters 101–106 has 8 bits in order to achieve the 6-bit character format to 4-bit character format alignment (six-to-four bit alignment). A detailed description of the shifter network 205 in an alignment network will be described hereinunder. The numbers inside the block of shifter 102 are the sequential input terminal positions of the shifter of the preferred embodiment of FIG. 14, and are applicable to all the shifters of FIG. 5.

Figure 6:
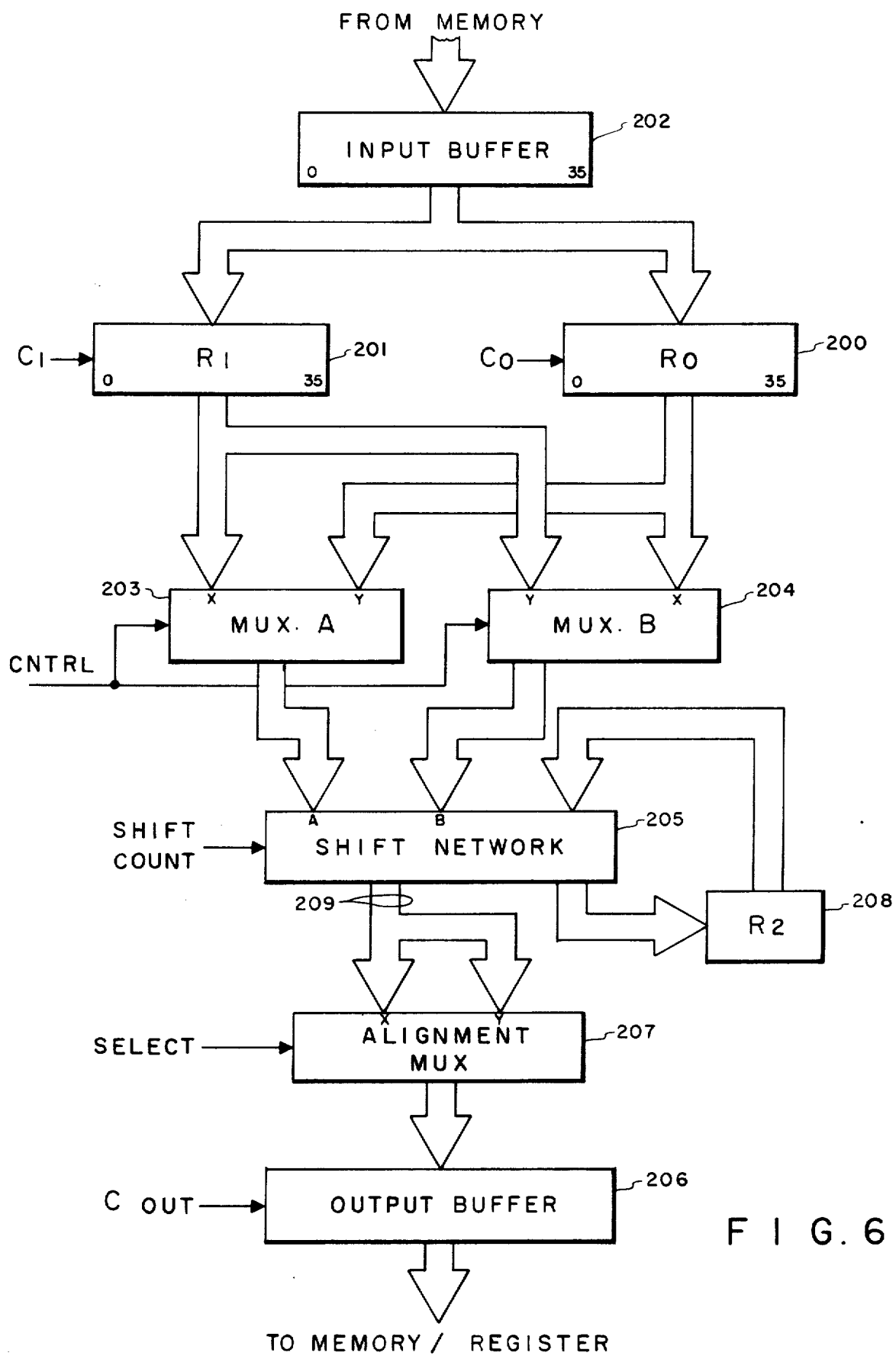
FIG. 6 shows a functional block diagram of the alignment network of the preferred embodiment of the present invention.

The six-four bit alignment network of the preferred embodiment will be described in conjunction with FIG. 6. FIG. 6 shows a functional block diagram of the alignment network. An input buffer 202 of the preferred embodiment receives a 36-bit input word from memory. The output of the input buffer 202 is connected to two 36-bit registers (R1, R0), 201, 200. The output of R1 201 is coupled to the X inputs of a first multiplexer, MUXA 203, and is further coupled to the Y inputs of a second multiplexer, MUXB 204. Likewise, the output of R0 200 is coupled to the X inputs of MUXB 204 and is further coupled to the Y inputs of MUXA 203. The output of MUXA 203 is coupled to the A inputs of shift network 205 and the outputs of MUXB 204 is coupled to the B inputs of shift network 205, the shift network 205 having been described above. In order to utilize the same alignment network to align six-to-six bit characters and to align six-to-four bit characters, the shifters utilize two additional inputs mentioned above in conjunction with a holding register, R2, 208. Further, as mentioned above, the output of the shifters each are increased to 8 bits, thereby providing in the preferred embodiment a 48-bit output bus, 209, from shift network 205. Selected bits from the output of shift network 205 are coupled to an alignment MUX 207 to an output buffer 206 under the control of a SELECT control signal. The operation of the shift network 205 will be described in detail hereinunder. The output of alignment MUX 207 can then be coupled to an output buffer 206 and utilized directly within the processor of the computer system or further coupled to a memory or a register within the computer system. The MUXs 203, 204, 207 can be of the general 2×1 MUX type having 36 wide X inputs and 36 wide Y inputs, and are often times referred to as switches.

Figure 7:
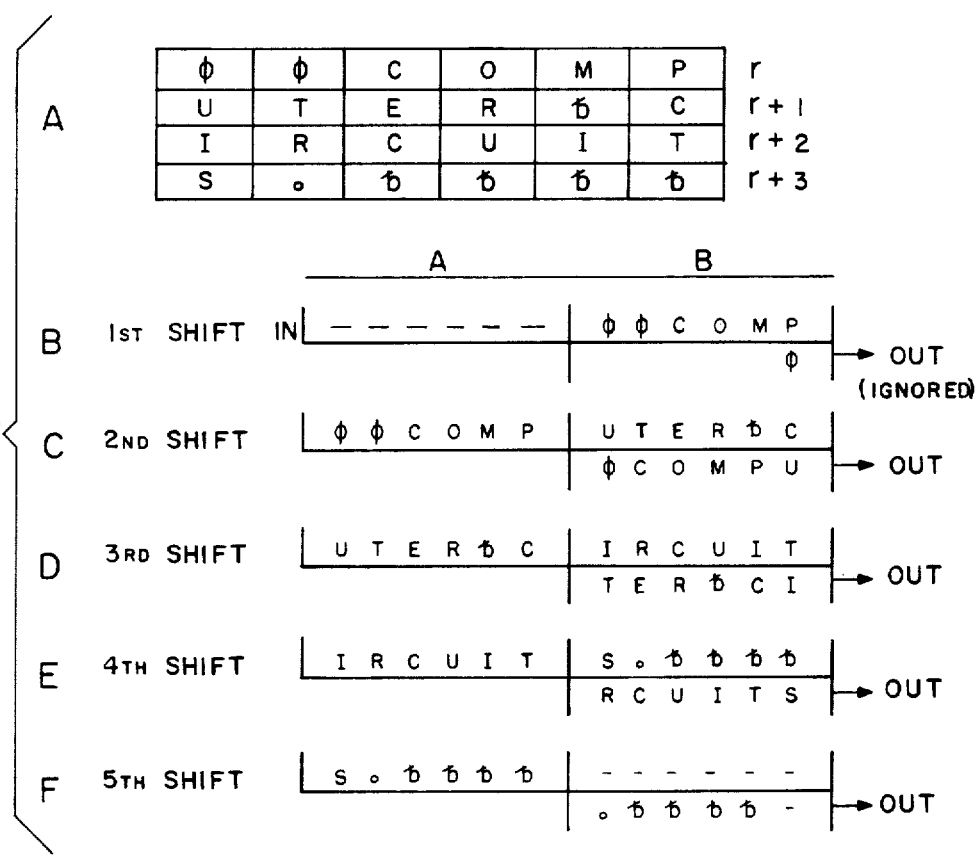
FIG. 7 shows a block of words as they reside in memory and as they go through the plurality of shifting steps for a six-to-six bit character shift.

Before proceeding with an operational description of the alignment network it will be helpful to understand the general function of the operation to be performed. Referring to FIG. 7, assume a data block of four data words of the six-bit character format resides in main memory (not shown) at locations r, r+1, r+2, and r+3, FIG. 7A, and a six-to-six character shift is to be performed. If each character is to be shifted left one character location, the OP CODE would specify a move left-to-right operation, the type TY1 would specify a six-bit format, the number of characters would be specified by N1 to be 22 (assuming all the required characters of the four words are to be shifted, $\phi$ is a dont't care character), the field of the descriptor word CN1 would equal 2 specifying character 2 as the character number within the data word referenced, and the field y1 would specify r as the address of the data word. The second descriptor word would indicate the location in memory where the shifted data is to be stored along with the other information as described above. In this example, for a one character shift, CN2 would be specified as 1. The amount of the shift (i.e., the shift count value) is simply the difference in character pointers CN2-CN1. However, when calculating the shift count, a negative shift count can result which is not valid for the modulus six shifter of the present invention. Therefore, a value of six is added to any resultant negative shift count, which in this example yields a shift count of five. FIGS. 7B-7F show the shift cycles required to shift the four words of FIG. 7A. The first word from memory location r is applied to the B inputs of the shift network 205 and shifted five characters, FIG. 7B. The output from the first shift cycle is invalid and is ignored. On the next cycle the first word from memory location r is applied to the A inputs and the second word is applied to the B inputs. A five character shift occurs causing the C from the first word to be shifted into the appropriate character location of the outputted word, all the other characters of the first word being shifted the designated five character positions including the U character from the next word, and the output stored, FIG. 7C. The process continues (FIGS. 7D-7F) until all the characters have been shifted the specified one character position to the left. From this example it can be readily seen that each word to be shifted is applied to the shifter inputs twice, once to the A input and once to the B input, as mentioned above.

From the general description of the shifter network 205 discussed above, it can be seen that for a move right-to-left operation it will be necessary for the configuration of the above described shifters to operate on the words in upper memory first (i.e., r+3), and operate on the words in descending order of memory. Therefore the first word to be read and loaded into R0 200 is the fourth word in memory (r+3). The read reversal is initiated by a controller (not shown). Therefore, the shift network effectively operates as a right shifter. The controller (not shown) generates the necessary control signals based on decoding the OP CODE and performing the necessary operations on the information contained in the various descriptor words. Such controllers, which may be implemented utilizing hardwired logic elements known in the art or utilizing a microprocessor in conjunction with a control store and associated firmware, are well known in the art and are not discussed further herein.

Figure 8:
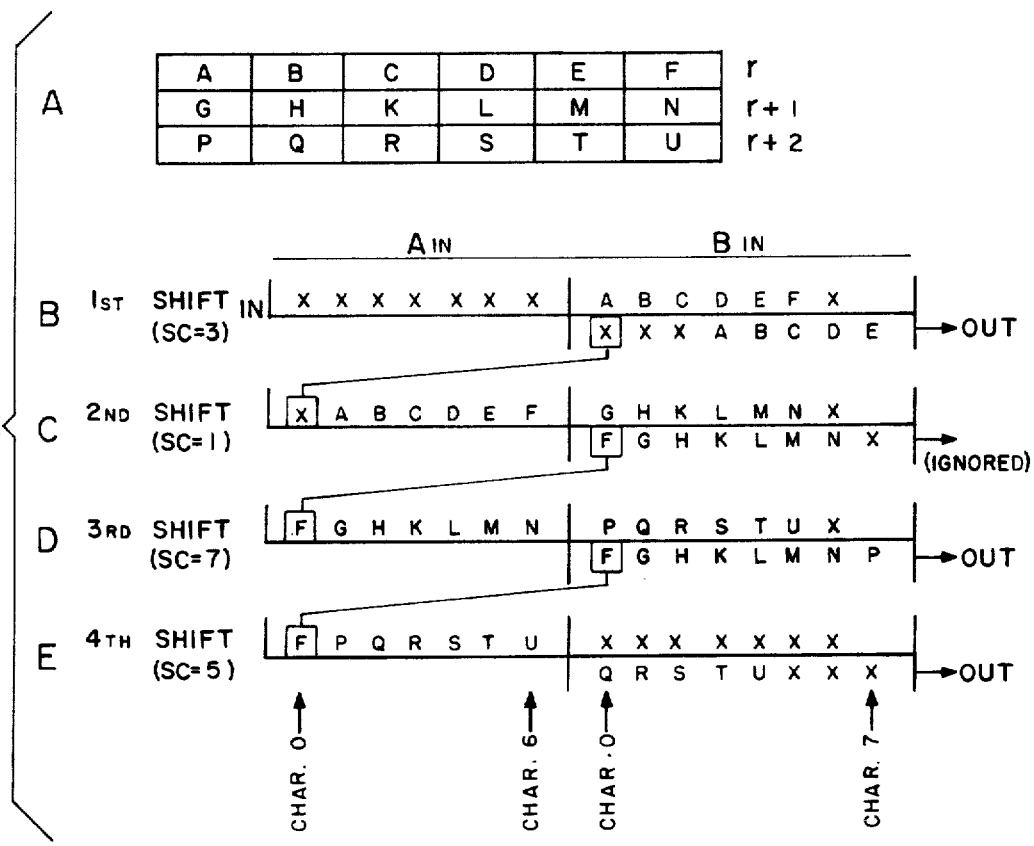
FIG. 8 shows a block of words as they reside in memory and as they go through the plurality of shifting steps for a left-to-right shift of a six-to-four bit character shift.

In order to gain a more complete understanding of the present invention, it will be helpful to discuss a move (or shift) of six-to-four bit character data. Referring to FIG. 8, assume a block of 3 data words (having the six-bit character format) resides in main memory (not shown) at locations r, r+1, and r+2 (FIG. 8A). Assume further that the field of descriptor words CN1 has a value 0 and CN2 has a value of 3, indicating character 0 is to be shifted (or aligned) into character position 3, i.e., a shift of the data to the right. Descriptor fields TP1 and TP2 have a value in this example of 6 and 4, respectively, indicating a 6-bit character format for the first operand and a 4-bit character format for the second operand. Note that in this example, each letter of FIG. 8A represents a six-bit numeric character stored in the respective memory locations, i.e., A is the Ath numeric character position, etc. . . . . FIGS. 8B-8E show the shift cycles required to shift the three words of FIG. 8A. The shift count is determined by CN2-CN1 which results in a shift count value of 3. The first word from memory location r is applied to the B inputs of the shift network 205 and shifted the number of characters specified by the shift count, FIG. 8B. On the next cycle the first word from memory location r is applied to the A inputs, the second word is applied to the B inputs, and the shift count is decremented by 2. Note the utilization of the seven A input positions, seven B input positions, and eight output positions. The low character output position (the X in the box outputted from the first shift operation shown in FIG. 8B) is inputted to the low character A input position on the next cycle. This is accomplished by holding the low character output position in holding register R2, 208. A detailed description of holding register R2, 208 will be given hereinunder. The shift count is decremented by two by the controller each cycle. When the shift count has a value of zero or one, the output is invalid and hence is discarded by any conventional technique well known to those skilled in the art. The operation continues as depicted in FIG. 8 until all the characters have been shifted.

Figure 9:
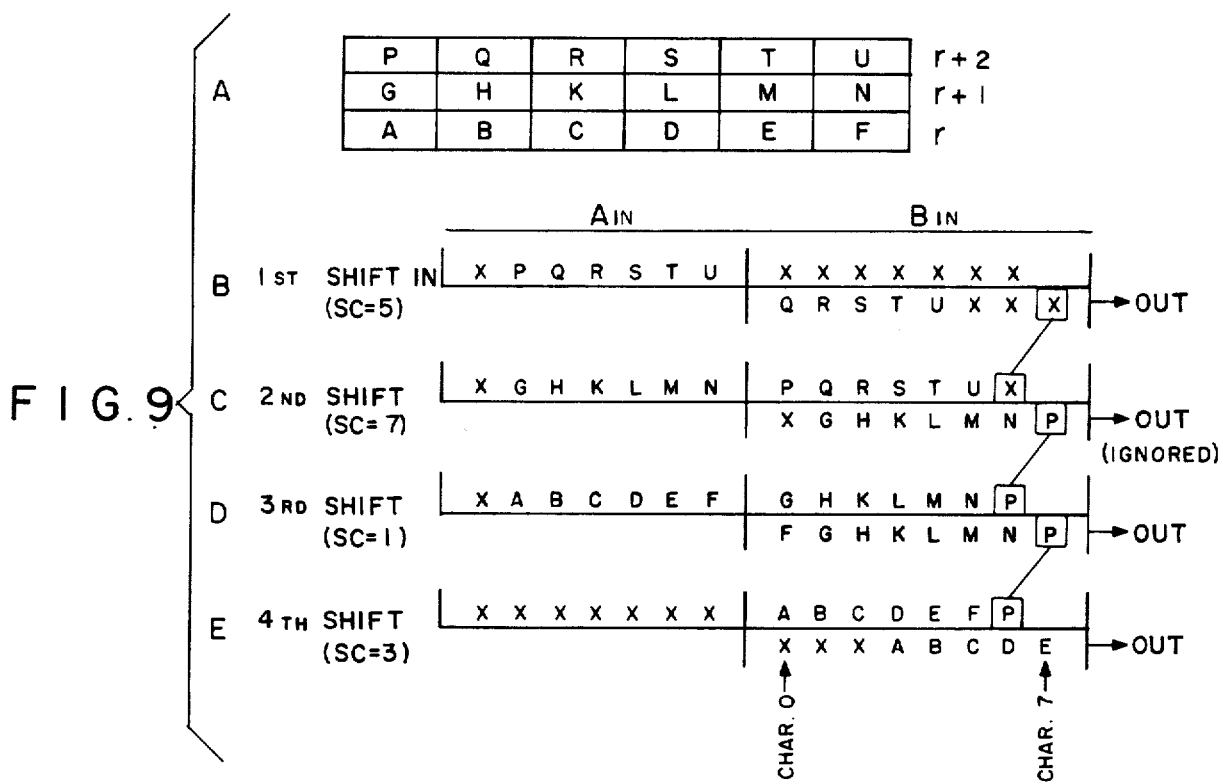
FIG. 9 shows a block of words as they reside in memory and as they go through the plurality of shifting steps for a right-to-left shift of a six-to-four bit character shift.

An example of a right to left shift is now given, with reference to FIG. 9. Again three data words (having six-bit character format) reside in main memory (not shown) at locations r, r+1, and r+2, (FIG. 9A, note upper memory is shown at the top of the list). In this example assume that the field of descriptor word CN1 has a value of 5 and CN2 has a value of 4, indicating a one character shift to the left is the desired operation. Descriptor fields TP1 and TP2 have a value of 6 and 4 respectively, indicating a 6-bit character format for the first operand and a 4-bit character format for the second operand, as in the previous example. Again in this example, each letter of FIG. 9A represents a 6-bit numeric character stored in the respective memory location. FIGS. 9B-9E show the shift cycles required to shift the three words of FIG. 9A. The shift count is determined by taking CN2-CN1 which results in a negative value, −1. A value of six is added to this result when a negative value is detected, resulting in a shift count of 5. The first word (i.e., the word at memory location r+2) is applied to the A inputs of shift network 205 with no inputs applied to the B inputs of shift network 205, and the inputs are shifted the number of characters specified by the shift count, FIG. 9B. On the next cycle, the first word (i.e., from memory location r+2) is applied to the B inputs of shift network 205, the next word (i.e., from memory location r+1) is applied to the A inputs of shift network 205, and the shift count incremented by 2. The high character output position (i.e., the X in the box outputted from the first shift operation shown in FIG. 9B), character 7 of the output, is inputted to the highest character input position (character 6) of the B input on the next cycle. This is accomplished by holding the high character output position in holding register R2, 208, which will be described in detail hereinunder. The shift count is incremented by two by the controller for a right-to-left shift operation. Further, when a shift count has a value of zero or seven, the output is invalid and is discarded under the control of the controller.

Figure 10:
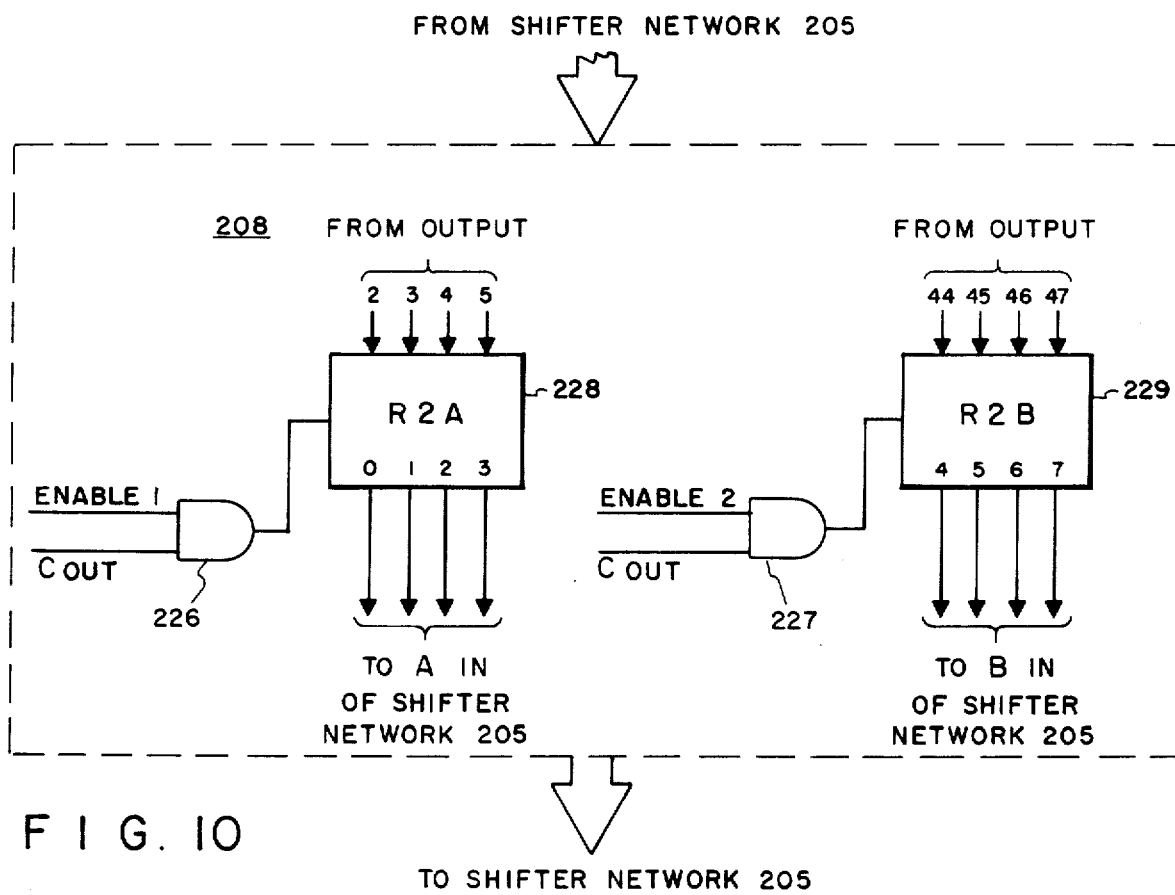
FIG. 10 shows a block diagram of a holding register.

FIG. 10 shows a function block diagram of holding register, R2, 208. Holding register, R2, 208 is shown comprising a first character holding register R2A, 228, and a second character holding register, R2B, 229. Both the first and second character holding registers 228, 229 are standard four-stage parallel in-parallel out registers. For a shift left-to-right of six-to-four bit character format, R2A, 228 is utilized by action of a control signal, ENABLE1, from the controller (not shown). As described above, at the appropriate time of the cycle, the low character output position is temporarily stored in R2A, 228 by control signal $C_{OUT}$ from the controller (not shown). The input to R2A, 228 is from the output of shifter network 205, bits 2, 3, 4 and 5, each from shifter 103, 104, 105, 106. These bits make up the 4 numeric bits of low character output position. (It will be recognized by those skilled in the art that bits 0 and 1 from shifters 101, 102 make up the remaining 2 bits of the low character output position for a 6-bit character format but these bits are normally zero. Unless one of these bit positions is utilized for an overpunch indication, these bits need not be utilized and hence reduces the size of the character holding registers 228, 229 from six-to-four bits). The output of R2A, 228 denoted in FIG. 10 by stages 0, 1, 2, 3, is coupled to the A side of shifters 103, 104, 105, 106, to the positions denoted in FIG. 5 as R2A-0, R2A-1, R2A-2, and R2A-3, respectively, thereby inputting the low character output position to the low character A input position on the next cycle of the shift left-to-right operation as described above in conjunction with FIG. 8. Still referring to FIG. 10, R2B is utilized in the shift right-to-left operation, as that described in conjunction with FIG. 9, by action of an enabling control signal, ENABLE2. The four stages of R2B, 229 denoted 4, 5, 6, 7, receive inputs from shifter network, 205, bits 44, 45, 46, 47, each from shifter 103, 104, 105, 106, respectively. The output of R2B, 229 is coupled to the B side of shifters 103, 104, 105, 106 to the positions denoted in FIG. 5 as R2B-4, R2B-5, R2B-6, and R2B-7, respectively, thereby inputting the high character output position to the highest character input position of the B input (i.e., character position 6 of the B input). The control signal ($C_{OUT}$) of output buffer 206 may be held low to inhibit invalid output data from output buffer 206. If this approach is utilized, the control signal utilized for enabling AND-gate 226, 227 must be a modified $C_{OUT}$ signal, $\overline{C_{OUT}}$, i.e., the control signal of AND-gate 226, 227 $\overline{C_{OUT}}$ is permitted to go high to load the desired character in the respective holding register 208.

Figure 11:
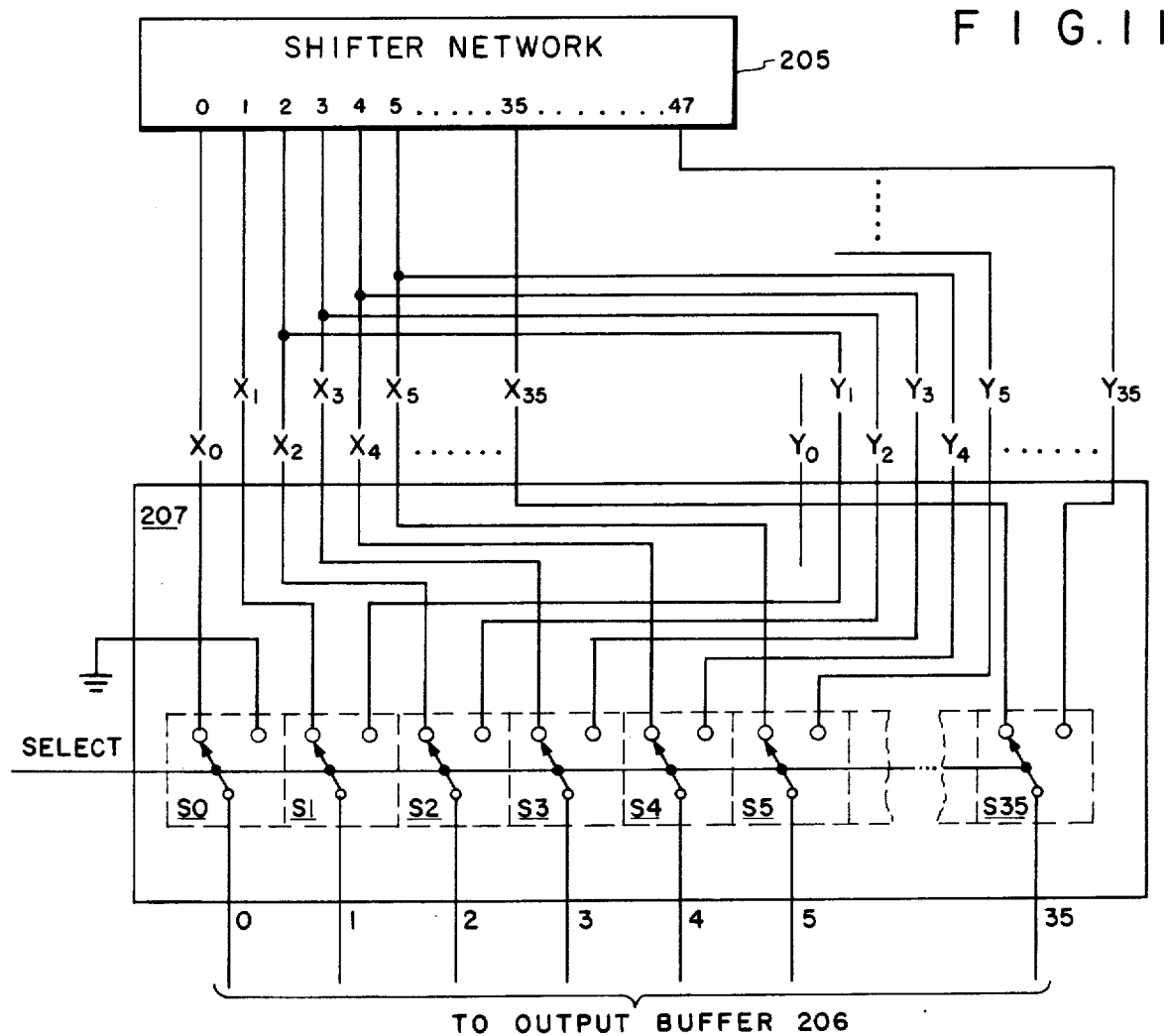
FIG. 11 shows a functional logic diagram of an alignment MUX of the present invention.

FIG. 11 shows the detailed connection of alignment MUX 207 with shifter network 205 outputs. As discussed above, shifter network 205 outputs 48 bits, 0–47, via output bus 209. Alignment MUX 207 is shown functionally as a set of double pole switches S0, S1, . . . S35, having a 36 bit output, which is coupled to the output buffer 206. One pole of the switch (the left pole) is designated the "X" input and the other pole of the switch (the right pole) is designated the "Y" input. When a six-to-six bit shift is being performed the control signal, SELECT, from the controller (not shown), is such that the X pole is selected. When a six-to-four bit shift is being performed, the Y pole is selected by the SELECT control signal. In order to achieve the correct packing for the six-to-four shift, the Y inputs to alignment MUX 207 must be properly chosen from the outputs of shifter network 205. The Y inputs to alignment MUX 207 from shifter network 205 is indicated in Table 1. Note that the S0 Y pole is connected to ground (or a logic zero level) to ensure bit 0 is a zero, corresponding to the 4 bit character format defined previously. In a like manner, the Y poles of S9, S18, and S27 are connected to the logic zero level. Since no alignment is necessary for the six-to-six bit conversion, the X inputs of alignment MUX 207 are connected to the corresponding shifter network 207 outputs.

TABLE 1

| Shifter Outputs | Alignment MUX Y Input |
| --- | --- |
| 2-5 | 1-4 |
| 8-11 | 5-8 |
| 14-17 | 10-13 |
| 20-23 | 14-17 |
| 26-29 | 19-22 |
| 32-35 | 23-26 |
| 38-41 | 28-31 |
| 44-47 | 32-35 |

Figure 13:
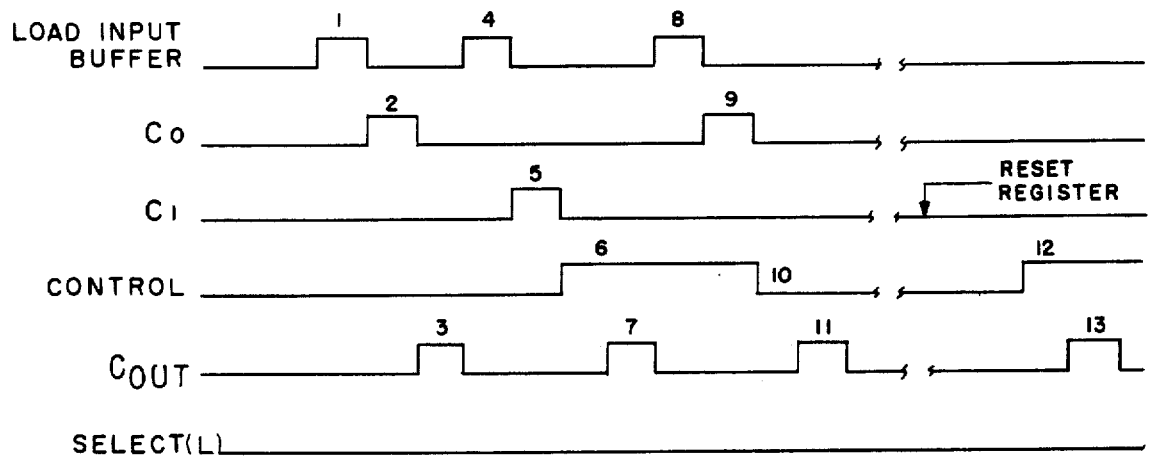
FIG. 13 shows the shift network control timing.
Figure 12:
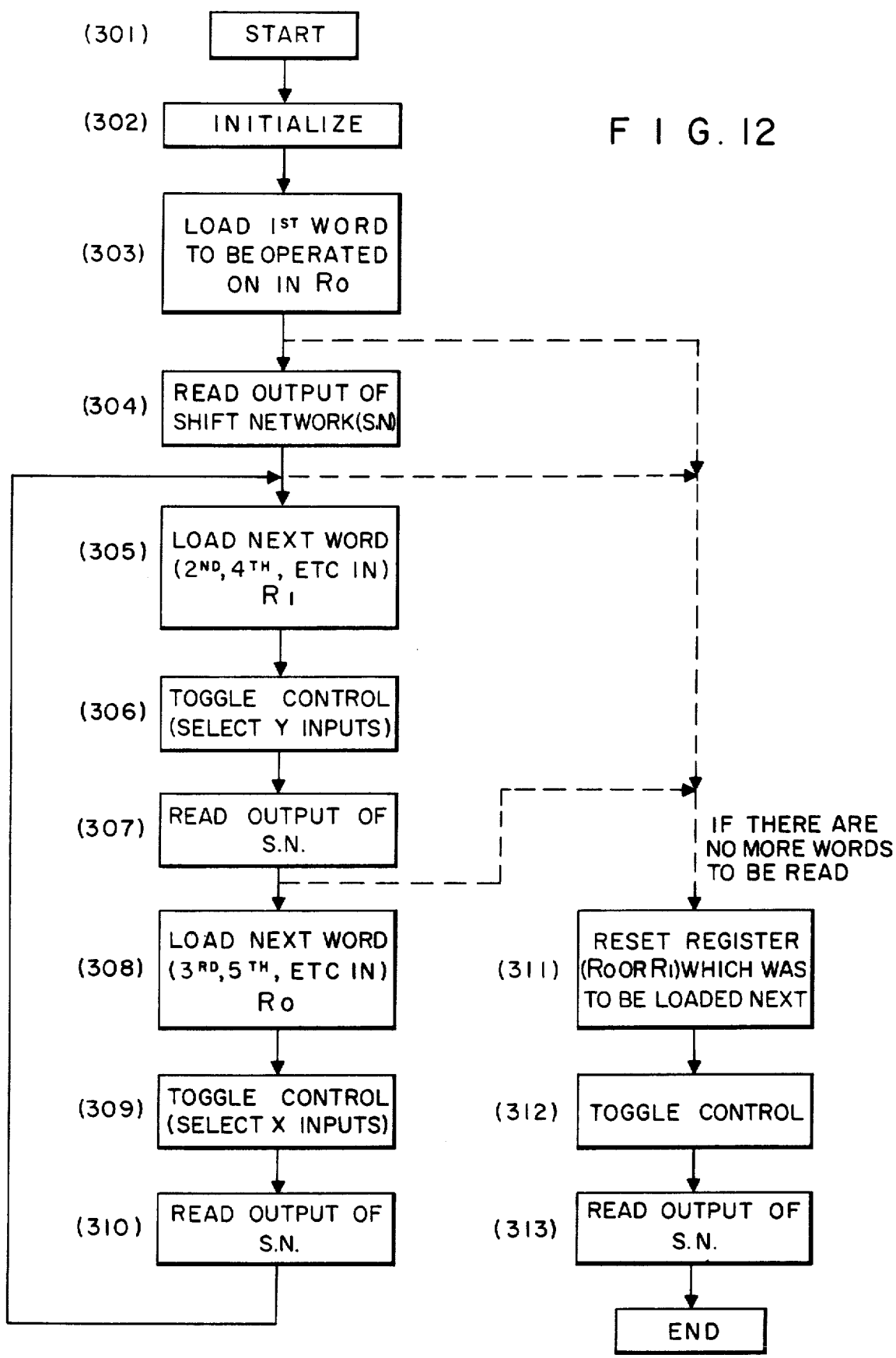
FIG. 12 shows a functional flow diagram of the control signals generated by a controller.

The operation of the six-four bit alignment network will now be described in conjunction with FIGS. 12 and 13. FIG. 12 shows a functional flow diagram of the control signals generated by a controller (not shown), and FIG. 13 shows the shift network control timing. Once a move right to left for a six-to-six bit character operation has been decoded the alignment network is activated and the operation starts (block 301). The alignment network is initialized which includes initialization of the controller (not shown) for generating the necessary control signals required to drive the alignment network, including resetting the appropriate hardware, setting a shift count in the shift network as determined by a controller, resetting control signals $C_0$, $C_1$, SELECT, ENABLE1, ENABLE2 and CNTRL, setting the various indexes for the total number of words to be read, and maintaining the address of the current word from main memory (block 302). A pulse (1 of FIG. 13) is generated by the controller (not shown) causing the first word to be operated on by the shift network 205 to be loaded into the input buffer 202 from main memory. Control pulse $C_0$ (2 of FIG. 13) causes the word in the input buffer 202 to be loaded in register R0 200 (block 303). Control pulse $C_{OUT}$ (3 of FIG. 13) causes the output of the shift network 205 to be read (and transferred to a destination), the output of the shift network 205 being the shifted data (block 304). The next word to be operated on is loaded into R1 201 (block 305) under the action of control pulses (4, 5 of FIG. 13). The state of control signal CNTRL is toggled (6 of FIG. 13) or switched such that the Y inputs of MUXA 203 and MUXB 204 are selected. This causes the contents of R0 200 to be coupled to the A inputs of shift network 205 and the contents of R1 201 (which was previously applied to the A inputs of the shift network 205) to now be applied to the B inputs of shift network 205 (block 306). $C_{OUT}$ (7 of FIG. 13) causes the next word of the shifted data to be outputted from shift network 205 (block 307). The next word to be operated on is loaded into register R0 200 (8, 9 of FIG. 13) (Block 308). CNTRL is toggled (10 of FIG. 13) to select the X inputs of the respective MUXs 203, 204 (block 309), and the output of the shift network 205 is read (11 of FIG. 13) (block 310). The operation of loading R0 200 and R1 201 alternately continues at block 305 under the action of the control signals. At various points in the operation, a determination is made whether any more words are to be read, namely after block 303, 304, and 307. If no more words are to be read, the next register which would have been loaded had the operation continued is reset (block 311) and CNTRL is toggled (12 of FIG. 13) (block 312). The output of the shift network 205 is read (block 313) (13 of FIG. 13) and the operation is terminated. The SELECT control signal is low (L) thereby selecting the X inputs to alignment MUX 207. Control signals ENABLE1, and ENABLE2, are inoperative.

For a six-to-four bit shift, SELECT is set high (to select the Y inputs to alignment MUX 207). ENABLE1 would be set to enable AND-gate 226 for a left-to-right shift operation and ENABLE2 would be set to enable AND-gate 227 for a right-to-left shift operation. It will be recognized by one skilled in the art that the enable control signals may not be necessary since the data in the register not being used is a "don't care". Control signal $C_{OUT}$ is used to gate the appropriate character into the enabled character holding register.

Figure 14:
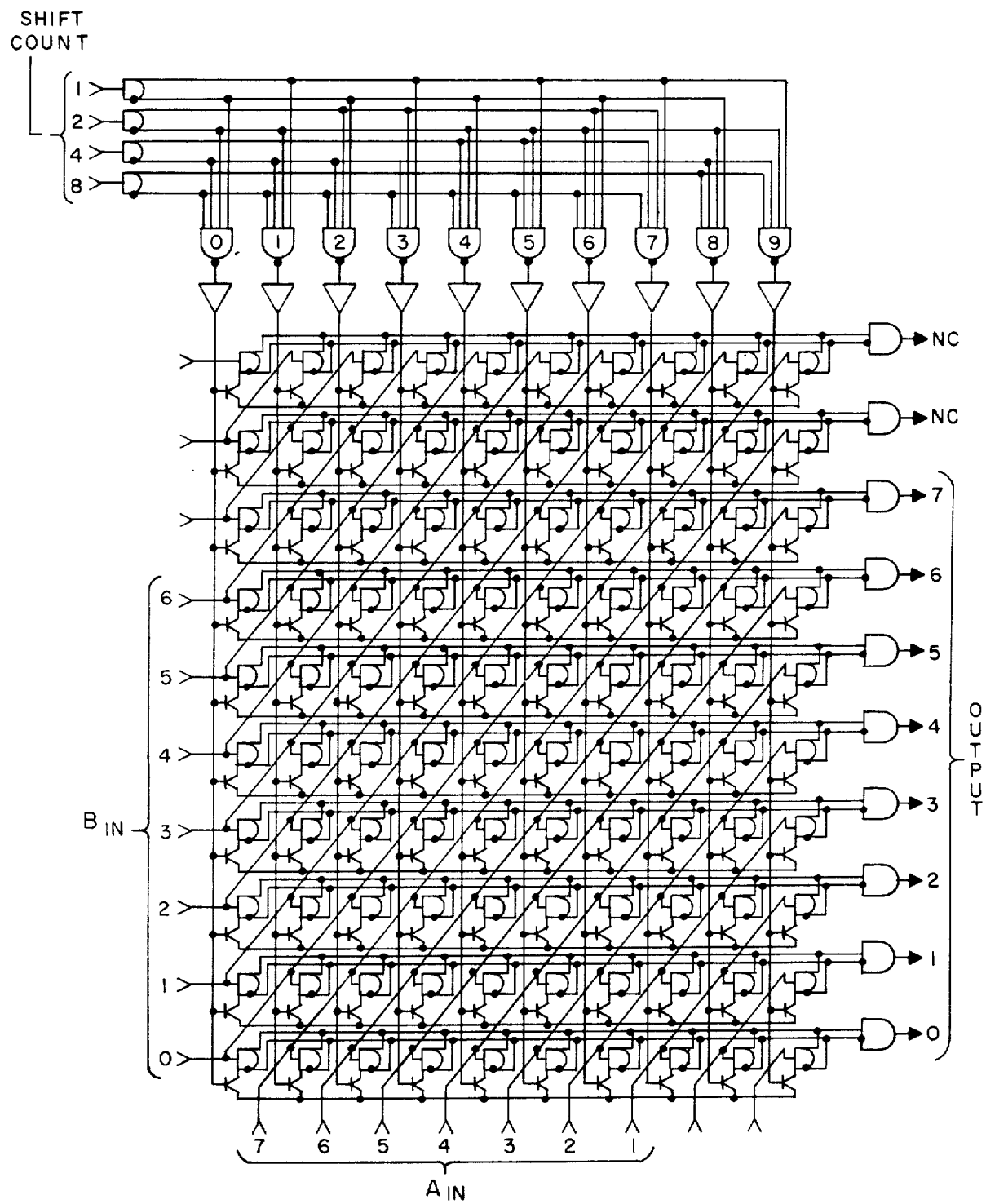
FIG. 14 shows a logic diagram of the shifter of the preferred embodiment of the present invention.

Although the above discussion describes the control functions of the shifter network 205 in a sequential fashion, it will be understood by those skilled in the art that some of the control functions can be done simultaneously without departing from the spirit of scope of the invention. It will be further understood by those skilled in the art that some of the control functions may be varied (such as the manner for checking the end of the shifting operation) without departing from the spirit or scope of the invention. A logic diagram of the shifter 101, 102, 103, 104 105 and 106 of the preferred embodiment is shown in FIG. 14 and is implemented in Current Mode Logic (CML). It is understood that many combinations of computer data word formats exist. Applying the above discussed principles it can be seen that many alternative data word formats and packing combinations can be derived. Also, shifters can be divided, they can be cascaded, or an equivalent single shifter having a sufficient number of input and output terminals may be implemented with a number of holding registers to achieve an alignment network of the present invention.

While there has been shown what is considered to be the preferred embodiment of the invention, it will be manifest that many changes and modifications can be made therein without departing from the essential spirit and scope of the invention. It is intended, therefore, in the annexed claims, to cover all such changes and modifications which fall within the true scope of the invention.

We claim:

1. In a computer system which includes a memory, said computer system having a plurality of predefined computer words stored in said memory, including data words having a plurality of data formats, each data format having a predetermined number of characters within the data word, and wherein the data words of a predetermined data format are grouped together thereby forming a data block in said memory, an alignment network for aligning said data words, comprising:
    (a) shift network means, having a first set of input terminals, a second set of input terminals, and a set of output terminals, for operatively connecting selected ones of said first and second set of input terminals to said output terminals in response to a shift count control signal, thereby causing the characters with the data words applied to the first and second set of input terminals to be shifted at the output terminals;
    (b) register means, operatively connected to said shift network means, for temporarily storing at least two contiguous data words of a predetermined data block, to apply a first data word of said two contiguous data words to selected ones of said second set of input terminals of said shift network means, and to apply a second data word of said two contiguous data words to selected ones of said first set of input terminals, each application of the data words to said shift network means from said register means being a shift cycle, such that on the next shift cycle said second word of said data block is applied to said second set of input terminals and a third data word of said data block is applied to said first set of input terminals, said third data word being contiguous to said second data word;
    (c) holding register means, operatively connected to said shift network means, for temporarily storing data of selected ones of said output terminals of said shift network means in response to an enable control signal, to couple said temporarily stored data to predetermined ones of said first and second set of input terminals on a next shift cycle; and
    (d) means, operatively connected to the set of output terminals of said shift network means, for packing the shifted data of said output terminals to one of the plurality of data formats in response to a select control signal.

2. An alignment network according to claim 1, wherein said shift network means comprises:
    at least one shifter, having a plurality of shifter input terminals and a plurality of shifter output terminals, each of said shifter input terminals adapted to receive a predetermined signal, representing a bit of said data words, from said register means.

3. An alignment network according to claim 2, wherein said register means comprises:
    (a) a first and second register for temporarily storing the first and second data word of said two contiguous data words; and (b) a first and second switch means, each operatively coupled to said first register and to said second register, the first switch means having an output operatively coupled to selected ones of said first set of input terminals of said shift network means, the second switch means having an output operatively coupled to selected ones of said second set of input terminals of said shift network means, for selectively outputting said first or second data word temporarily stored in said first and second register.

4. In a computer system which includes a memory, said computer system having a plurality of predefined computer words stored in said memory, including data words having a plurality of data formats, each data format having a predetermined number of characters within the data word, and wherein the data words of a predetermined data format are grouped together thereby forming a data block in said memory, an alignment network for aligning said data words, comprising:

(a) shift network means, having a first set of input terminals, a second set of input terminals, and a set of output terminals, for operatively connecting selected ones of said first and second set of input terminals to said output terminals in response to a shift count control signal, thereby causing the characters with the data words applied to the first and second set of input terminals to be shifted at the output terminals;

(b) register means, operatively connected to said shift network means, for temporarily storing at least two contiguous data words of a predetermined data block, to apply a first data word of said two contiguous data words to selected ones of said second set of input terminals of said shift network means, and to apply a second data word of said two contiguous data words to selected ones of said first set of input terminals, each application of the data words to said shift network means from said register means being a shift cycle, such that on the next shift cycle said second data word of said data block is applied to said second set of input terminals and a third data word of said data block is applied to said first set of input terminals, said third data word being contiguous to said second data word, continuing to apply the next contiguous data word of the data block during the next shift cycle until all the data words of the data block have been applied to the selected ones of the second set of input terminals of said shift network means;

(c) holding register means, operatively connected to said shift network means, for temporarily storing data of selected ones of said output terminals of said shift network means in response to an enable control signal, to couple said temporarily stored data to predetermined ones of said first and second set of input terminals on a next shift cycle; and (d) means, operatively connected to the set of output terminals of said shift network means, for packing the shifted data of said output terminals to one of the plurality of data formats in response to a select control signal.

* * * * *